(12) United States Patent
Chapman et al.

(10) Patent No.: US 10,708,195 B2
(45) Date of Patent: Jul. 7, 2020

(54) PREDICTIVE SCHEDULER

(71) Applicant: Cisco Technology, Inc., San Jose, CA (US)

(72) Inventors: John T. Chapman, Orange, CA (US); Elias Chavarria Reyes, Fremont, CA (US); Alon Shlomo Bernstein, Monte Sereno, CA (US); Dantong Liu, Mountain View, CA (US); Zheng Lu, Milpitas, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 36 days.

(21) Appl. No.: 16/141,517

(22) Filed: Sep. 25, 2018

(65) Prior Publication Data
US 2019/0097945 A1 Mar. 28, 2019

Related U.S. Application Data

(60) Provisional application No. 62/563,201, filed on Sep. 26, 2017.

(51) Int. Cl.
H04L 12/911 (2013.01)
H04L 12/28 (2006.01)
H04L 12/801 (2013.01)

(52) U.S. Cl.
CPC ........ H04L 47/823 (2013.01); H04L 12/2861 (2013.01); H04L 12/2878 (2013.01); H04L 47/127 (2013.01)

(58) Field of Classification Search
CPC . H04L 47/127; H04L 47/823; H04L 12/2861; H04L 12/2878
See application file for complete search history.

(56) References Cited

U.S. PATENT DOCUMENTS

| | | | | |
|---|---|---|---|---|
| 6,820,042 B1* | 11/2004 | Cohen | ................... | H04L 41/145 702/179 |
| 7,277,391 B1* | 10/2007 | Aweya | .................... | H04L 47/10 370/230 |
| 7,424,546 B1* | 9/2008 | Aweya | ................ | H04L 43/0894 370/229 |
| 2003/0117955 A1* | 6/2003 | Cohen | ................... | H04L 41/145 370/230 |
| 2006/0083270 A1* | 4/2006 | Lee | ...................... | H04L 12/2854 370/521 |
| 2009/0249417 A1* | 10/2009 | Goguen | .............. | H04L 12/2801 725/111 |

(Continued)

OTHER PUBLICATIONS

International Search Report issued in PCT/US2018/052659 dated Dec. 11, 2018 (16 pgs.).

(Continued)

Primary Examiner — Jenee Holland
(74) Attorney, Agent, or Firm — Merchant & Gould P.C.

(57) ABSTRACT

Predictive scheduling may be provided. First, a first device may identify when a service flow is expected to become active. The first device may estimate an initial traffic profile in response to identifying when the service flow is expected to become active. The first device may then grant allocation based on the initial traffic profile of the service flow. Next, the first device may collect feedback to later update the traffic profile estimate. The first device may then update the traffic profile estimate.

17 Claims, 3 Drawing Sheets

(56) References Cited

U.S. PATENT DOCUMENTS

| | | | | |
|---|---|---|---|---|
| 2009/0303879 A1* | 12/2009 | Duffield | ................ | H04L 43/024 370/235 |
| 2009/0303901 A1* | 12/2009 | Duffield | ................ | H04L 43/024 370/253 |
| 2011/0239256 A1* | 9/2011 | Gholmieh | ........... | H04W 72/005 725/62 |
| 2012/0155265 A1* | 6/2012 | Ballani | ................ | H04L 47/826 370/235 |
| 2013/0201852 A1* | 8/2013 | Chou | .................... | H04W 24/02 370/252 |

OTHER PUBLICATIONS

W. Al-Khatib et al: "A Novel Bandwidth Allocation Algorithm for DOCSIS Based Hybrid Fiber Coaxial Networks", Iranian Journal of Electrical and Computer Engineering, Mar. 27, 2006, XP055529713, Retrieved from the Internet: URL:https://pdfs.semanticscholor.org/8297/a8cbc19805a52531c7b20dadb3785434cb8f.pdf [retrieved on Dec. 4, 2018] (7 pgs.).

ITU-T J.222.2—(Jul. 2007) Series J: Cable Networks and Transmission of Television, Sound Programme and Other Multimedia Signals, Third-generation transmission systems for interactive cable television services—IP cable modems: MAC and Upper Layer protocols vol. 1: Core Recommendation XP055176523 [7.2.1.7. Protocol Example pp. 165-166; 7.2.1.4.2. Piggieback Requesting pp. 162-163; 7.2.1 Upstream Bandwidth Allocation; pp. 151-164 : (434 pgs.).

Kumar, S et al.: "Improved priority access, bandwidth allocation and traffic scheduling for docsis cable networks", IEEE Transactions on Broadcasting, IEEE Service Center, Piscataway, NJ, US, vol. 49, No. 4, Mar. 17, 2003 (Mar. 17, 2003, pp. 371-382, XP011103813, ISSN: 0018-9316, COI: 10.1109/TBC.2003,819522 (12 pgs.).

Al-Khatib W et al.: "Bandwidth Allocation Algorithm for DOCSIS Based HFC Broadband Networks", Signal Processing, Commuications and Netowrking, 2007. ICSCN '7. International Conference on, IEEE, PI, Feb. 1, 2007 (Feb. 1, 2007), pp. 452-458, xp031103538, ISBN: 978-1-4244-0996-9. (7 pgs.).

* cited by examiner

PREDICTIVE SCHEDULER

RELATED APPLICATION

Under provisions of 35 U.S.C. § 119(e), Applicant claims the benefit of U.S. Provisional Application No. 62/563,201 filed Sep. 26, 2017, which is incorporated herein by reference.

TECHNICAL FIELD

The present disclosure relates generally to network predictive scheduling.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
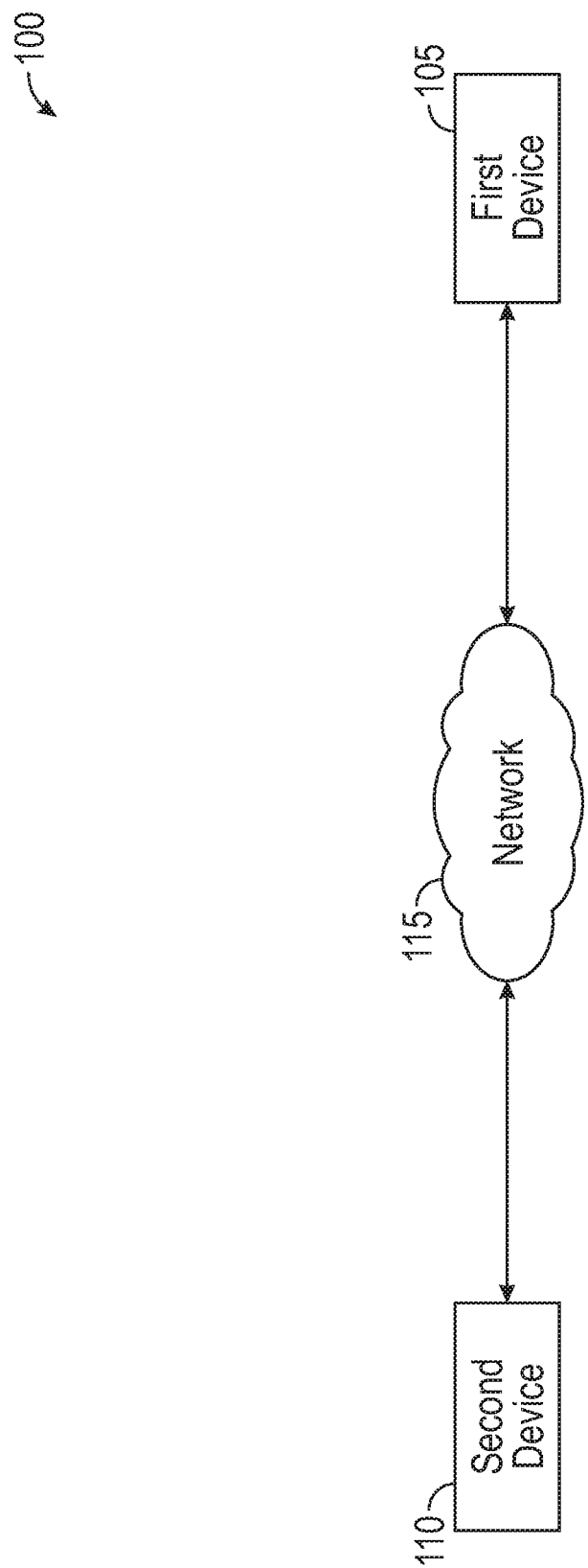
FIG. 1 shows a system for providing predictive scheduling.

Predictive scheduling may be provided. First, a first device may identify when a service flow is expected to become active. The first device may estimate an initial traffic profile in response to identifying when the service flow is expected to become active. The first device may then grant allocation based on the initial traffic profile of the service flow. Next, the first device may collect feedback to later update the traffic profile estimate. The first device may then update the traffic profile estimate.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Conventional Data Over Cable Service Interface Specifications (DOCSIS) upstream uses a request-grant approach. The DOCSIS upstream latency, using this conventional request-grant approach, may be more than three times the propagation delay between a Cable Modem (CM) and a Cable Modem Termination System (CMTS). With Remote-PHY (RPHY) deployment where the distance between the CM and the CMTS may go beyond 1,250 miles for example, the DOCSIS upstream latency may be more than 30 ms using the conventional request-grant approach. The high latency may be problematic, for example, for network Quality of Service (QoS), especially for delay sensitive services. Consequently, a predictive scheduler may reduce the upstream latency in DOCSIS for example.

A predictive scheduler, consistent with embodiments of the disclosure may be able to predict incoming data traffic from a CM and issue a grant before the data arrives at the CM. In this way, a CMTS may not need to wait for a request (e.g., a REQ) from a CM before issuing a grant. As such, the total upstream latency may be reduced by embodiments of the disclosure, for example, to one time of CM-CMTS propagation delay from the original three times of CM-CMTS propagation delay.

The predictive scheduler consistent with embodiments of the disclosure may provide a predictive capability in the CMTS that may effectively reducing upstream latency. This may be especially useful for the RPHY deployment scenario where the latency may be higher than desired using the conventional DOCSIS scheduling. In addition, embodiments of the disclosure may allow DOCSIS to provide mobile backhaul, since mobile may mandate low end-to-end latency and embodiments of the disclosure may provide a predictive scheduler that may allow DOCSIS to be a feasible low-latency backhaul solution for mobile networks.

FIG. 1 shows a system 100 for providing predictive scheduling consistent with embodiments of the disclosure. As shown in FIG. 1, system 100 may comprise a first device 105, a second device 110, and a network 115. First device 105 may comprise, but is not limited to, a Cable Modem Termination System (CMTS). The aforementioned is an example and first device 105 may comprise any other similar microcomputer-based device. Second device 110 may comprise, but is not limited to, a cable modem, a Wi-Fi access point, a cellular base station, a tablet device, a mobile device, a smart phone, a telephone, a remote control device, a set-top box, a digital video recorder, a personal computer, a network computer, a mainframe, or a router. The aforementioned are examples and second device 110 may comprise any other similar microcomputer-based device.

Network 115 may comprise, but is not limited to, a Content Delivery Network (CDN) or a Hybrid Fiber-Coaxial (HFC) network. The aforementioned are examples and network 115 may comprise any other network capable of passing data between first device 105 and second device 110. First device 105 and second device 110 may communicate over network 115 using the Data Over Cable Service Interface Specification (DOCSIS) international telecommunications standard.

First device 105 and second device 110 may be practiced in hardware and/or in software (including firmware, resident software, micro-code, etc.) or in any other circuits or systems. Furthermore, first device 105 and second device 110 may be practiced in electrical circuits comprising discrete electronic elements, packaged or integrated electronic chips containing logic gates, a circuit utilizing a microprocessor, or on a single chip containing electronic elements or microprocessors. In addition, first device 105 and second device 110 may also be practiced using other technologies capable of performing logical operations such as, for example, AND, OR, and NOT, including but not limited to, mechanical, optical, fluidic, and quantum technologies.

Figure 2:
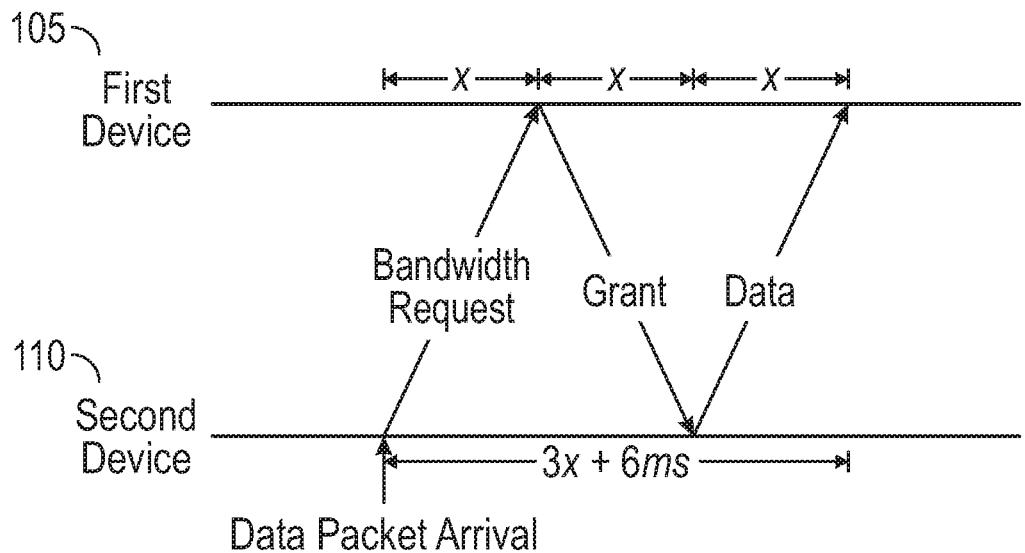
FIG. 2 illustrates a conventional system.

FIG. 2 illustrates a conventional system for transmitting data between first device 105 and second device 110. As shown in FIG. 2, a data packet may arrive at second device 110. In response, second device 110 may request bandwidth from first device 105 and first device 105 may grant this bandwidth request. In response to the bandwidth request grant, second device 110 may send the data packet to first device 105.

The conventional bandwidth/grant process shown in FIG. 2 may create overhead that may negatively affect upstream packet latency. For example, sending the bandwidth request from second device 110 to first device 105 may take a predetermined amount of time (e.g., x amount of time). In addition, sending the grant from first device 105 to second device 110 may take another predetermined amount of time (e.g., x amount of time). Moreover, sending the data packet from second device 110 to first device 105 may take yet another predetermined amount of time (e.g., x amount of time). Consequently, the total amount of time between when the data packet arrives at second device 110 and when it arrives at first device 105 may comprise 3x+y ms. In the above example, each of the predetermined amounts of time may be the same or different. In addition, y may comprise, but is not limited to, 6 ms.

Figure 3:
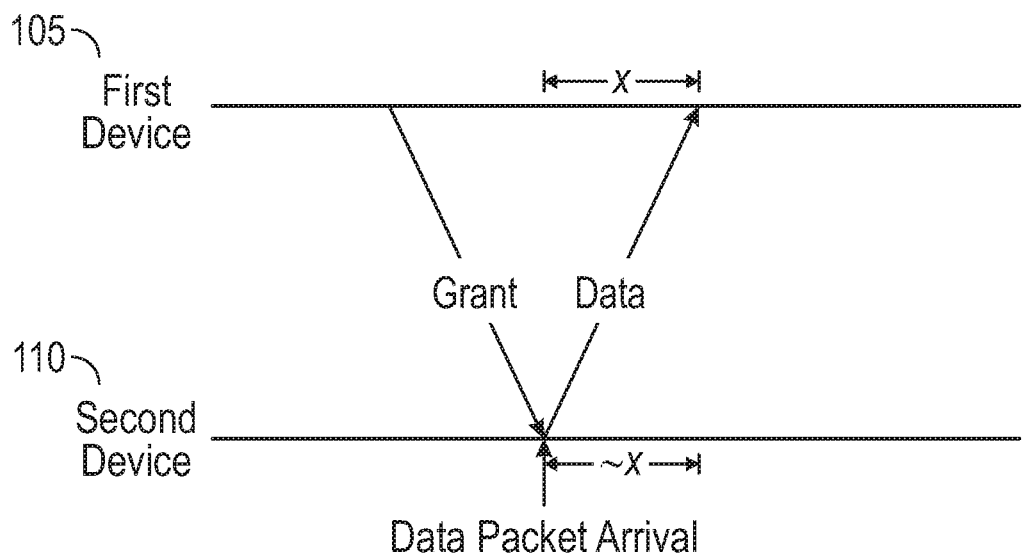
FIG. 3 shows a system for providing predictive scheduling.

FIG. 3 shows a system for providing predictive scheduling consistent with embodiments of the disclosure. As shown in FIG. 3, the grant may be provided by first device 105 to second device 110 prior to the data packet arriving at second device 110. In other words, the grant may arrive at second device 110 before it is requested and by the time it may be needed. Consequently, embodiments of the disclosure may reduce upstream packet latency, for example, from 3x to approximately x. For example, with 1,250 miles of MAC-to-MAC distance, x may comprise 10 ms and 3x may comprise 30 ms. With 5,000 miles of MAC-to-MAC distance, x may comprise 40 ms and 3x may comprise 120 ms. Consistent with embodiments of the disclosure, the process of FIG. 3 is described in greater detail below with respect to FIG. 4.

Figure 4:
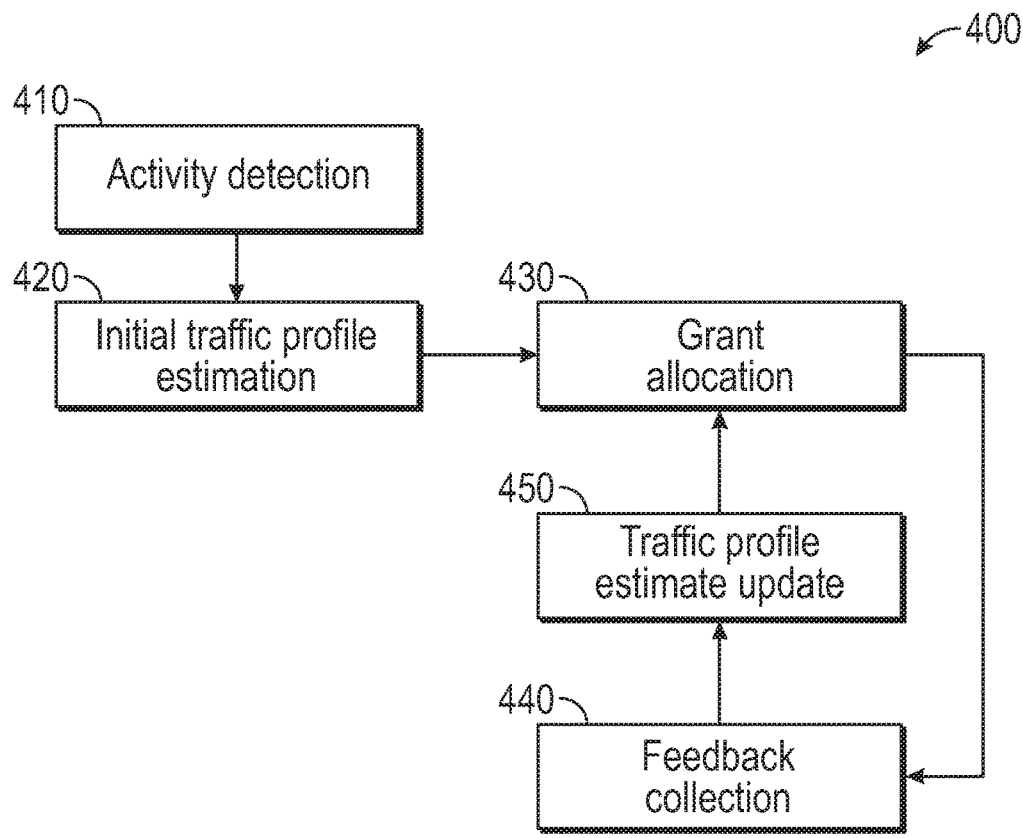
FIG. 4 is a flow chart of a method for providing predictive scheduling.

FIG. 4 is a flow chart setting forth the general stages involved in a method 400 consistent with embodiments of the disclosure for providing predictive scheduling. Method 400 may be implemented using first device 105 as described in more detail above with respect to FIG. 1. Ways to implement the stages of method 400 will be described in greater detail below.

Method 400 may begin and proceed to stage 410 where first device 105 may perform activity detection. For example, activity detection may be performed that may identify when the service flow is expected to become active. This may be based on arrival of bandwidth requests. However, consistent with embodiments of the disclosure, this may be based on inputs coming from outside first device 105, may be based on predictions carried out internally by first device 105, or may be based on the traffic flowing through first device 105 to second device 110.

As an example of how the activity detection based on the arrival of bandwidth requests may be performed, first device 105 may use the arrival of one or multiple bandwidth requests within a specific period of time as the condition upon which activity may be detected. In addition, the activity detection may limit the bandwidth requests that it considers as valid input to those that meet certain criteria, including, but not limited to, the size of the bandwidth request, or type of bandwidth request.

From stage 410, where first device 105 identifies when the service flow is expected to become active, method 400 may advance to stage 420 where first device 105 may estimate an initial traffic profile. For example, the initial traffic profile estimation may comprise a first estimate of how the upstream traffic is expected to be. This may comprise a bitrate estimate or may be predicted using other parameters (e.g., packet inter-arrival times).

As an example of the inputs that the initial traffic profile estimation may use, first device 105 may re-use the same data collected during activity detection stage 410 or may collect additional data from the same or new inputs. New inputs may include, but are not limited to, the configuration parameters being used by first device 105 to serve second device 110, the topology of the network 115, and the capabilities of second device 110.

As an example of how the initial traffic profile estimation may be performed, first device 105 may use the data from the set of bandwidth requests used during activity detection stage 410 to compute a probability distribution of packet inter-arrival time and packet sizes, which may comprise the initial traffic profile.

Once first device 105 estimates the initial traffic profile in stage 420, method 400 may continue to stage 430 where first device 105 may perform grant allocation based on the traffic profile. For example, grant allocation may be based on a traffic profile of each service flow. Since first device 105 may still need to issue grants in response to bandwidth requests and allocate resources for other purposes, first device 105 may decide to allocate the predictive grants before, at the same time, and/or after resources are allocated for other purposes. First device 105 may take into account the grants issued in response to bandwidth requests when issuing the predictive grants, and vice versa. First device 105 may issue grants lower than, the same as, or greater than those suggested by the traffic profile.

After first device 105 grants allocation based on the traffic profile in stage 430, method 400 may proceed to stage 440 where first device 105 may collect feedback. For example, feedback collection may comprise collecting feedback to later update or adjust the traffic profile estimate. For example, this may be collected every 1 second the number of bytes received per service flow. Additional feedback may also be collected (e.g., information from the bandwidth request, or grants utilized).

From stage 440, where first device 105 collects feedback, method 400 may advance to stage 450 where first device 105 may update the traffic profile estimate. For example, the traffic profile estimate update may be performed every 1 second the bitrate estimation of each service flow. The traffic profile estimate update may use, in addition to the feedback from stage 440, the same types of inputs used during the initial traffic profile estimation stage 420. Once first device 105 updates the traffic profile estimate in stage 450, grant allocation may be performed using the updated traffic profile estimate.

Consistent with embodiments of the disclosure, machine learning may be used to perform predictions for a DOCSIS upstream scheduler upon which grants allocation may be based. The machine learning may be applied, for example, at two levels: i) Level 1; and ii) Level 2.

Level 1 may be executed in real time at a CMTS (e.g., first device 105). These may be high-efficiency, lower-complexity, and fast machine learning processes that react quickly to short-term traffic dynamics. The output of these processes may directly impact the scheduling decisions of the CMTS upstream scheduler. The data features for this task may be coarse and quick to analyze, and may include elements such as the number of packets and bytes observed from a particular subnet in the previous time windows. As described below, higher level inferences about the subnet may be used based on a deeper analysis on the data features and more complex machine learning algorithms. Because the real-time computation may be relatively easy, it may be implemented on legacy hardware platforms for example.

Level 2 may be executed at a slower time scale than those in Level 1, and may reside outside the CMTS. These processes may utilize more features than those in Level 1, have a higher complexity than those of Level 1, and their execution speed may be lower than those of Level 1. The output of these processes may be fed back to those of Level 1 as to adjust the operation of the latter. Given more computational resources, more interesting data features may be extracted such as information present in the TLS handshake, HTTP requests/responses, or individual packet length/{inter-arrival times}/{TCP flags}. This information may be used to infer attributes about the endpoints within a given subnet, that can then in-turn be used by the efficient, short-term models to increase efficacy.

Working jointly, these two levels may be capable of adjusting to both short-term and long-term traffic dynamics, and with a higher performance than simpler techniques that rely only on a few features for traffic characterization. In addition the rating and ranking of the prediction may be measured as one can observe in real time how well the prediction matched reality, and use that to guide an expert system.

The prediction can work across different timescale resolution, e.g. there may be clearly periodicity at large time scales (e.g. peak times in the evening if we looks at hours resolutions) vs. other forms of prediction at smaller time resolution. The ability to work across timescales may also help building better prediction, for example, consider a system with a different kind of learning at different timescales (fast/slow) combined with expert based rules; a model such as "f=w_1*expert+w_1*slow+w_2*fast" and those weights may be automatically adjusted with or without expert guided influence. The system may provide configuration options for the various timescales (which may depend on compute resources) and detailed statistic that will give feedback on the efficiency of the prediction.

Figure 5:
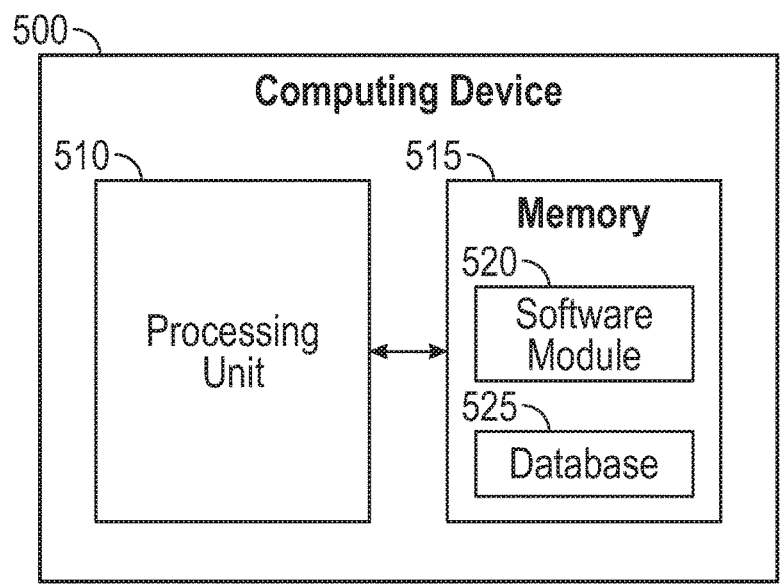
FIG. 5 shows a computing device.

FIG. 5 shows a computing device 500. As shown in FIG. 5, computing device 500 may include a processing unit 510 and a memory unit 515. Memory unit 515 may include a software module 520 and a database 525. While executing on processing unit 510, software module 520 may perform processes for providing predictive scheduling, including for example, any one or more of the stages from method 400 described above with respect to FIG. 4. Computing device 500, for example, may provide an operating environment for first device 105 or second device 110. First device 105 or second device 110 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   identifying, by a first device, when a service flow is expected to become active;
   estimating, by the first device, an initial traffic profile in response to identifying when the service flow is expected to become active, wherein estimating the initial traffic profile comprises using data from a set of bandwidth requests used during identifying when the service flow is expected to become active to determine a probability distribution of packet inter-arrival time and packet sizes that comprises the initial traffic profile;
   granting, by the first device, allocation based on the initial traffic profile of the service flow;
   collecting, by the first device, feedback to later update the initial traffic profile; and
   updating, by the first device, the initial traffic profile.

2. The method of claim 1, wherein identifying when the service flow is expected to become active comprises identifying when the service flow is expected to become active based on arrival of bandwidth requests from a second device.

3. The method of claim 1, wherein identifying when the service flow is expected to become active comprises identifying when the service flow is expected to become active based on arrival of bandwidth requests, from a second device, received within a specific period of time.

4. The method of claim 1, wherein identifying when the service flow is expected to become active comprises identifying when the service flow is expected to become active based on arrival of bandwidth requests, from a second device, that the first device determines to be valid input based on at least one of the following: a size of the bandwidth requests and a type of the bandwidth requests.

5. The method of claim 1, further comprising granting allocation based on the updated initial traffic profile of the service flow.

6. A system comprising:
   a memory storage; and
   a processing unit coupled to the memory storage, wherein the processing unit is operative to:
   identify when a service flow is expected to become active;
   estimate an initial traffic profile in response to identifying when the service flow is expected to become active, wherein the processing unit being operative to estimate the initial traffic profile comprises the processing unit being operative to use data from a set of bandwidth requests used during identifying when the service flow is expected to become active to determine a probability distribution of packet inter-arrival time and packet sizes that comprises the initial traffic profile;
   grant allocation based on the initial traffic profile of the service flow;
   collect feedback to later update the initial traffic profile; and
   update the initial traffic profile.

7. The system of claim 6, wherein the processing unit being operative to identify when the service flow is expected to become active comprises identifying when the service flow is expected to become active based on arrival of bandwidth requests from a second device.

8. The system of claim 6, wherein the second device comprises a Cable Modem (CM).

9. The system of claim 6, wherein the processing unit being operative to identify when the service flow is expected to become active comprises the processing unit being operative to identify when the service flow is expected to become active based on arrival of bandwidth requests, from a second device, received within a specific period of time.

10. The system of claim 6, wherein the processing unit being operative to identify when the service flow is expected to become active comprises the processing unit being operative to identify when the service flow is expected to become active based on arrival of bandwidth requests, from a second device, that the first device determines to be valid input based on at least one of the following: a size of the bandwidth requests and a type of the bandwidth requests.

11. The system of claim 6, wherein the first device comprises a Cable Modem Termination System (CMTS).

12. The system of claim 6, further comprising the processing unit being operative to grant allocation based on the updated initial traffic profile of the service flow.

13. A non-transitory computer-readable medium that stores a set of instructions which when executed by a processing unit perform a method comprising:
- identifying, by a first device, when a service flow is expected to become active;
- estimating, by the first device, an initial traffic profile in response to identifying when the service flow is expected to become active, wherein estimating the initial traffic profile comprises using data from a set of bandwidth requests used during identifying when the service flow is expected to become active to determine a probability distribution of packet inter-arrival time and packet sizes that comprises the initial traffic profile;
- granting, by the first device, allocation based on the initial traffic profile of the service flow;
- collecting, by the first device, feedback to later update the initial traffic profile; and
- updating, by the first device, the initial traffic profile.

14. The non-transitory computer-readable medium of claim 13, wherein identifying when the service flow is expected to become active comprises identifying when the service flow is expected to become active based on arrival of bandwidth requests from a second device.

15. The non-transitory computer-readable medium of claim 13, wherein identifying when the service flow is expected to become active comprises identifying when the service flow is expected to become active based on arrival of bandwidth requests, from a second device, received within a specific period of time.

16. The non-transitory computer-readable medium of claim 13, wherein identifying when the service flow is expected to become active comprises identifying when the service flow is expected to become active based on arrival of bandwidth requests, from a second device, that the first device determines to be valid input based on at least one of the following: a size of the bandwidth requests and a type of the bandwidth requests.

17. The non-transitory computer-readable medium of claim 13, further comprising granting allocation based on the updated initial traffic profile of the service flow.

* * * * *